(12) United States Patent
Hwang (10) Patent No.: US 6,517,376 B1
(45) Date of Patent: Feb. 11, 2003

(54) POSITIONING-SOUNDING DEVICE FOR CARD PULLER

(76) Inventor: Chin-Hwa Hwang, No. 14, Alley 6, Lane 315, Chung Cheng N. Rd, Sanchung, Taipei 241 (TW)

( * ) Notice: Subject to any disclaimer, the term of this patent is extended or adjusted under 35 U.S.C. 154(b) by 0 days.

(21) Appl. No.: 09/984,572

(22) Filed: Oct. 30, 2001

(51) Int. Cl.⁷ ................ B23P 19/02; G01D 11/00; H01R 3/00
(52) U.S. Cl. .............. 439/489; 116/67 R; 116/100; 116/306; 116/315; 116/200; 235/486; 235/483; 439/630; 70/432; 70/441
(58) Field of Search ............ 116/1, 2, DIG. 1, 116/DIG. 44, 200, 67 R, 100, 303, 605, 284, 294, 307, 306, 315; 340/568.7; 70/432, 441; 235/486, 487, 482, 483; 439/488, 489, 630

(56) References Cited

U.S. PATENT DOCUMENTS

| | | | | |
|---|---|---|---|---|
| 2,931,953 A | * | 4/1960 | Barney | 70/413 |
| 4,575,703 A | * | 3/1986 | Shishido | 235/482 |
| 4,674,628 A | * | 6/1987 | Prinsloo et al. | 116/2 |
| 4,859,199 A | * | 8/1989 | Komatsu | 439/267 |
| 4,936,790 A | * | 6/1990 | De La Cruz | 235/482 |
| 5,883,372 A | * | 3/1999 | Kim | 235/482 |
| 5,997,345 A | * | 12/1999 | Inadama | 439/489 |
| 6,082,017 A | * | 7/2000 | Simar | 116/67 R |

FOREIGN PATENT DOCUMENTS

JP 62009486 * 1/1987 .................. 234/7

* cited by examiner

Primary Examiner—Diego Gutierrez
Assistant Examiner—Travis Reis
(74) Attorney, Agent, or Firm—Bacon & Thomas, PLLC (57) ABSTRACT

A positioning-sounding device for a card puller, it generates a sound when an inserting and extracting member (an extended card) in the card puller is inserted in position to make sure that the member has been in position. Wherein, a sounding device is mounted in a slide groove of an insertion seat and has a slide block and an elastic element both can slide in the slide groove; thereby, when the inserting and extracting member is moved inwardly of a channel of the insertion seat, it drives the slide block inwardly to compress the elastic element. When the inserting and extracting member is in position, the slide block is abutted against and is released from the inserting and extracting member and is elastically restored to its original position by the elastic element to collide with the inner wall of the slide groove indicating that the inserting and extracting member is surely inserted in position.

6 Claims, 14 Drawing Sheets

POSITIONING-SOUNDING DEVICE FOR CARD PULLER

BACKGROUND OF THE INVENTION

1. Field of the Invention

The present invention is related to a positioning-sounding device for a card puller, and especially to such a positioning-sounding device provided in a card puller in order that the positioning-sounding device can make sure that an inserting and extracting member has been inserted in position, this can eliminate failure of contact and error in reading in successive using of the inserting and extracting member.

2. Description of the Prior Art

Since the advent of the automation science and techniques, automation equipment of digital science and techniques have substituted for a lot of things, important matters can be more precisely dealt with by the digital science and techniques, and data can be recorded in detail and well conserved. Therefore, various complicated as well as disordered matters and information can be put in order to make more convenience and comfort for daily life of people, and a goal of a life of the new age brought by the digital science and techniques can be enjoyed by people.

By virtue that IC cards and memory cards are small in volume, they are convenient for personal carrying, and are highly safe, numerous data cards thereby all are made in the forms of IC cards and memory cards. For example, IC cards can be used for monetary cards, credit cards, key cards, bus ticket cards, membership cards etc.; while memory cards can be used for compact flash cards, secure digital cards, memory stick cards, smart media cards and multi media cards etc.

The contents of the above listed cards all must be read with a reader, desired operations can then be proceeded to, in reading, a card is inserted into the reader for reading by the operation system in the reader and executing of an operation. When the card is inserted into the reader, it must be inserted to a correct position in order that the reader can read data without error; thereby, if the card is not certainly inserted to the correct position, the reader may make errors frequently during reading, and even information recorded in the card may be destroyed.

Figure 1:
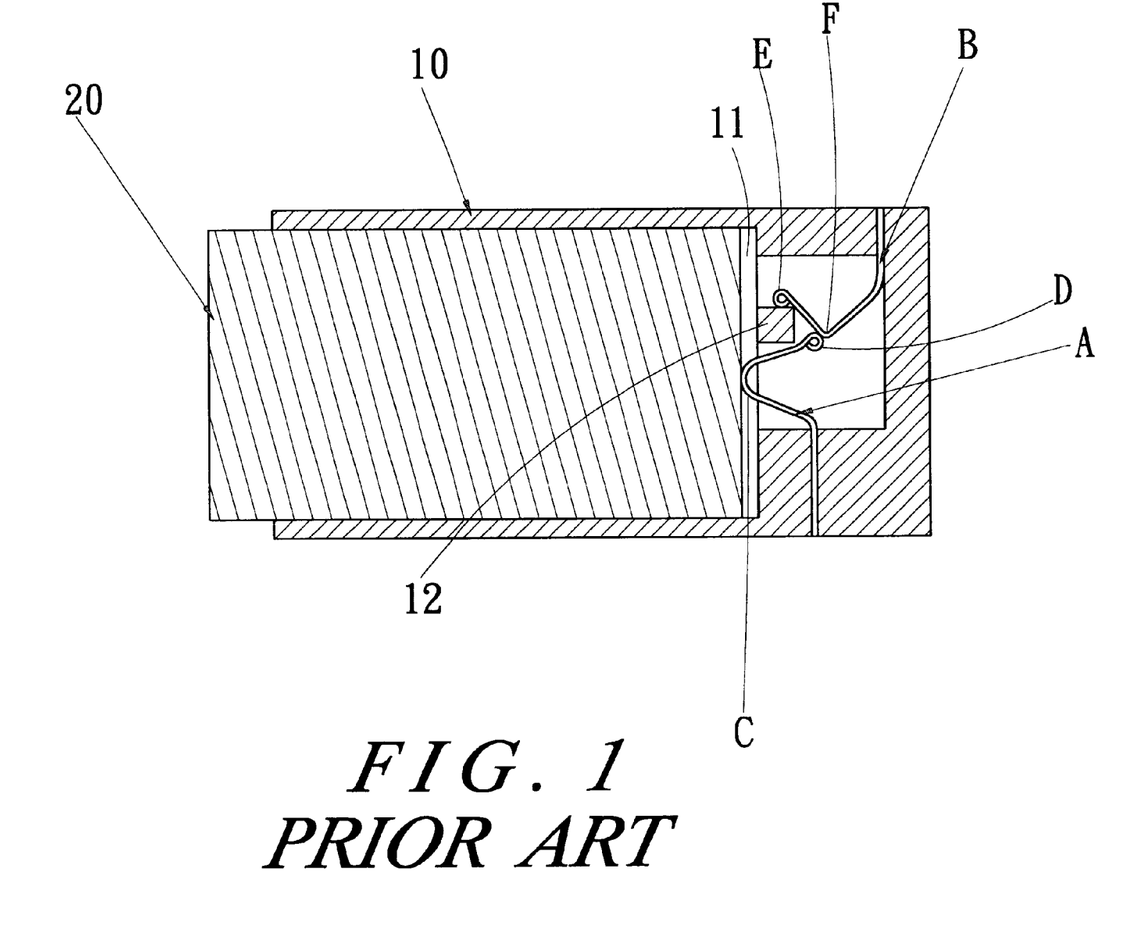
FIG. 1 is a sectional view showing a sounding device of a first conventional insertion seat.

Therefore, the inventor of the present invention decided to study and develop a more reliable positioning device of a card puller in view of the above stated defects of the conventional card puller being subjected to uncertain insertion connecting and resulting of errors in reading and destroying of data. During the process of studying and developing, the inventor had developed an elastic-sheet mode card-positioning structure (as shown in FIG. 1), the positioning structure is provided mainly in an insertion seat 10 thereof with a pusher elastic sheet "A" and a knocker elastic sheet "B".

Wherein: the insertion seat 10 is provided therein with a channel 11 for positioning of an inserting and extracting member 20, the channel 11 is provided in the inner area thereof with a knocking block 12. The pusher elastic sheet "A" is provided with a bended section having a pushing section "C" and a top contacting end "D"; the knocker elastic sheet "B" is provided with a bended section having a knocking end "E" and a contacting point "F". The top contacting end "D" of the pusher elastic sheet "A" is abutted against the contacting point "F" of the knocker elastic sheet "B", while the pushing section "C" is extended in the channel 11.

Figure 2:
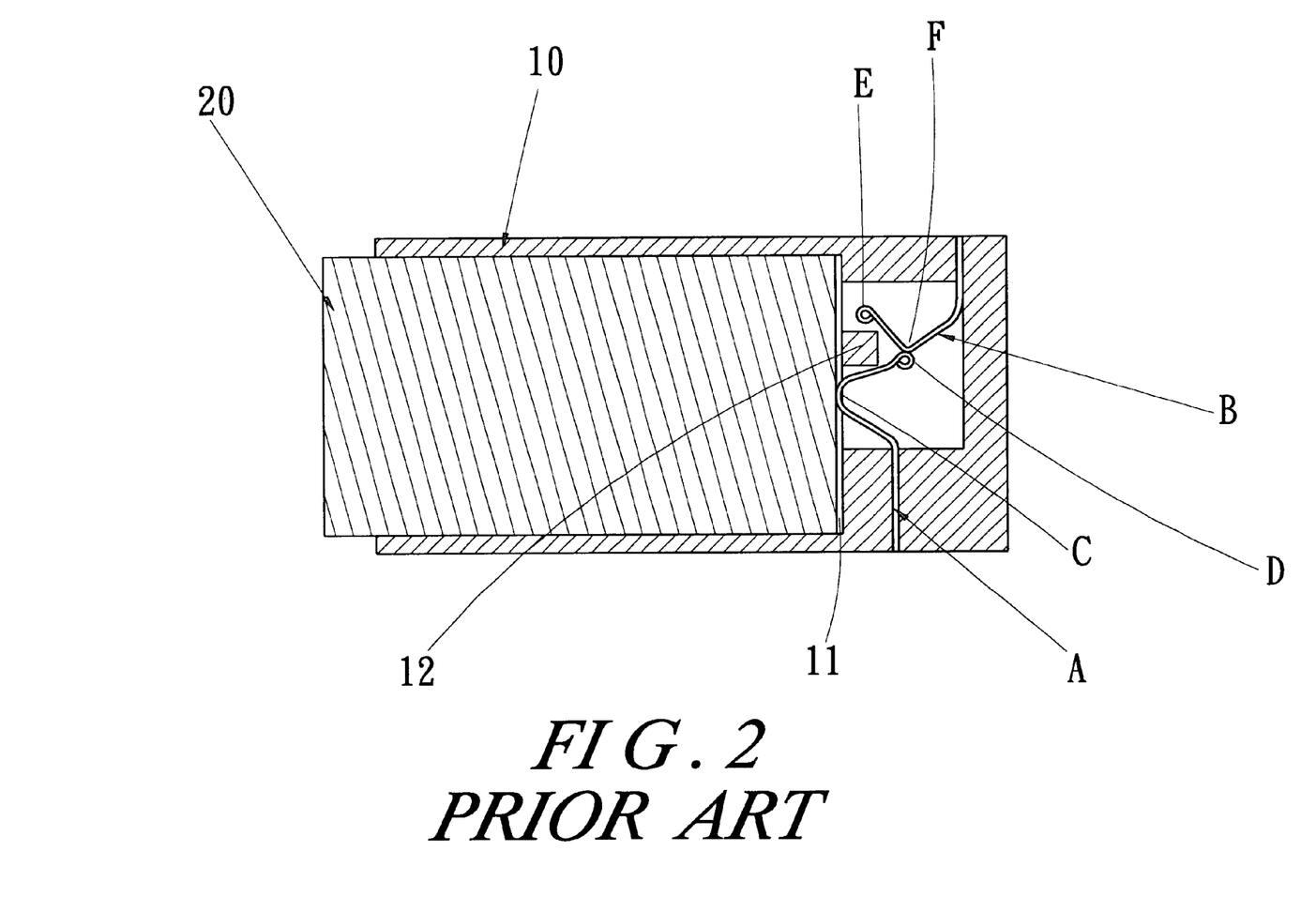
FIG. 2 is a schematic sectional view showing operation of FIG. 1.
Figure 3:
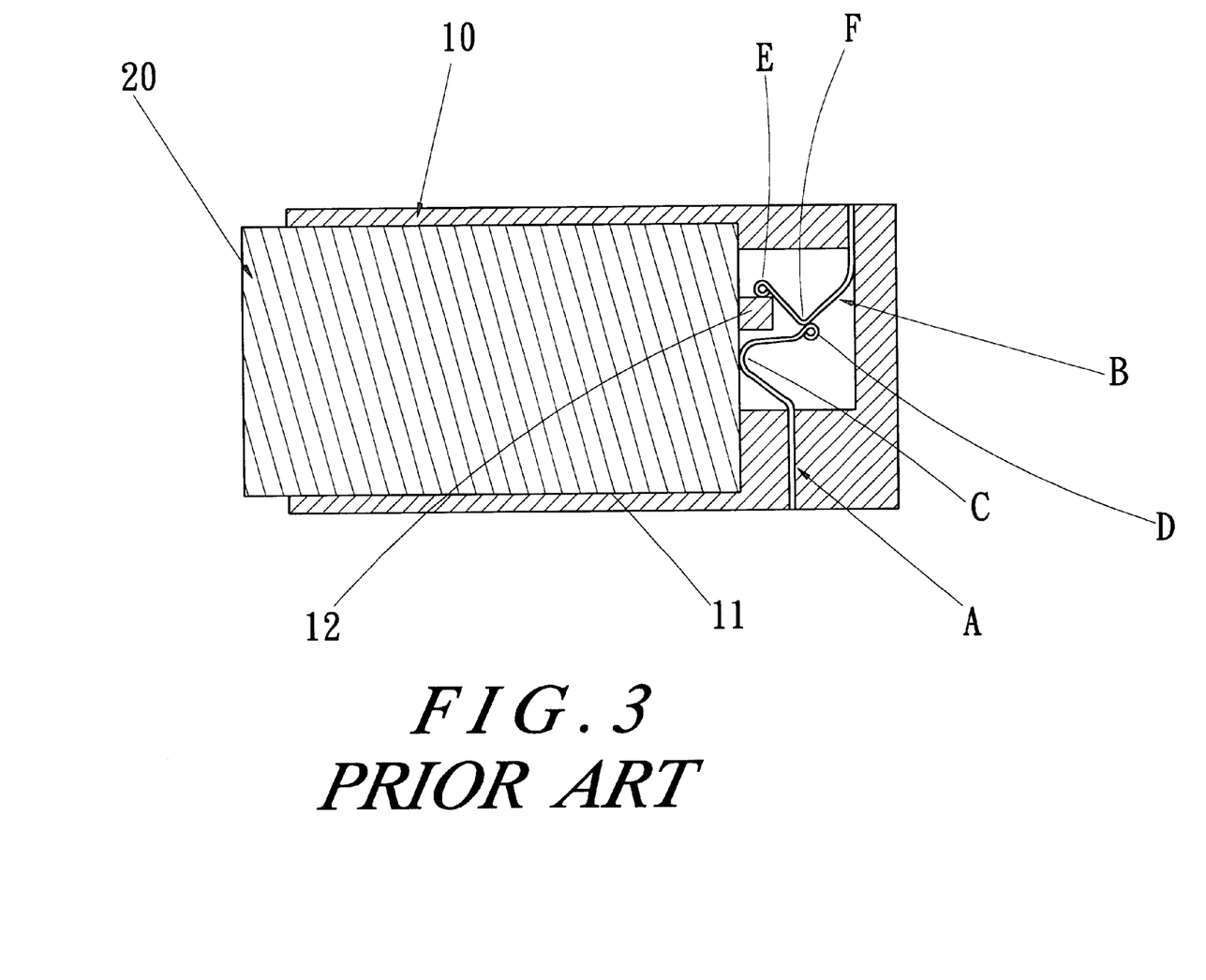
FIG. 3 is a schematic sectional view also showing operation of FIG. 1.
Figure 4:
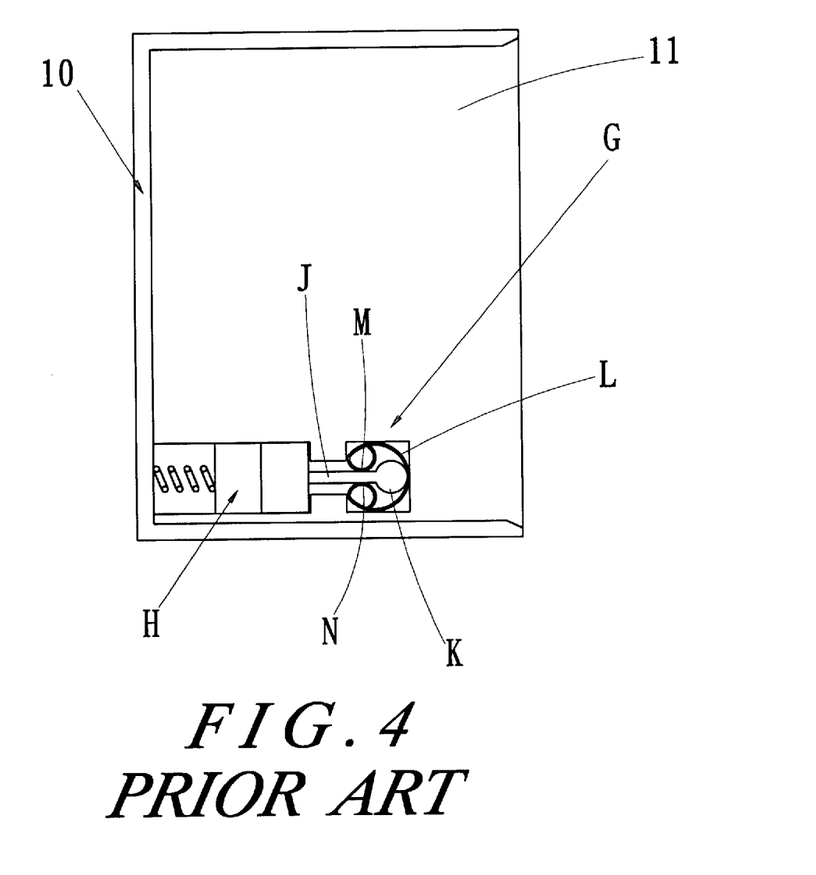
FIG. 4 is a schematic view showing a sounding device of a second conventional insertion seat.
Figure 5:
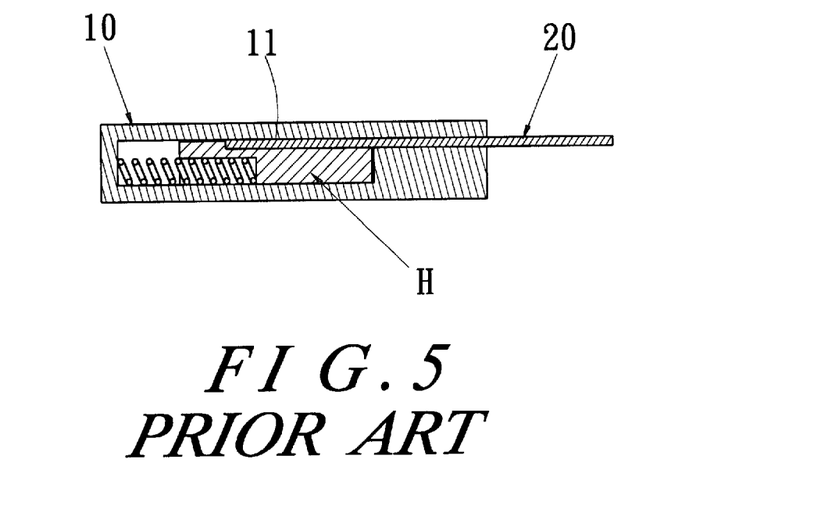
FIG. 5 is a sectional view showing the structure of FIG. 4.

When the inserting and extracting member 20 enters the channel 11, the inserting end thereof presses the pushing section "C" of the pusher elastic sheet "A" inwardly (as shown in FIG. 2). When the pushing section "C" is moved inwardly, the top contacting end "D" of the pusher elastic sheet "A" pushes the contacting point "F" of the knocker elastic sheet "B" to make the knocking end "E" of the knocker elastic sheet "B" be raised away from the knocking block 12. And when the inserting and extracting member 20 completely enters the channel 11 (also referring to FIG. 3), the top contacting end "D" of the pusher elastic sheet "A" passes the contacting point "F", so that the knocker elastic sheet "B" can be restored elastically to make bouncing of the knocking end "E" thereof back to the knocking block 12 to generate a knocking sound at the time of positioning.

Such a card positioning structure can make a knocking sound at the time of positioning, however, the elastic sheets may get elastic fatigue after using for a period of time, and thereby the actions between the pusher elastic sheet "A" and the knocker elastic sheet "B" will become uncertain, and the expected effect will not be achieved.

Referring simultaneously to FIGS. 4–7, the inventor of the present invention had developed another card positioning structure, the card positioning structure mainly is provided in an insertion seat 10 with a sounding device "G" which is provided with a link "J" behind a slide block "H". The link "J" is provided on the end thereof with a pushing away round block "K".

Figure 6:
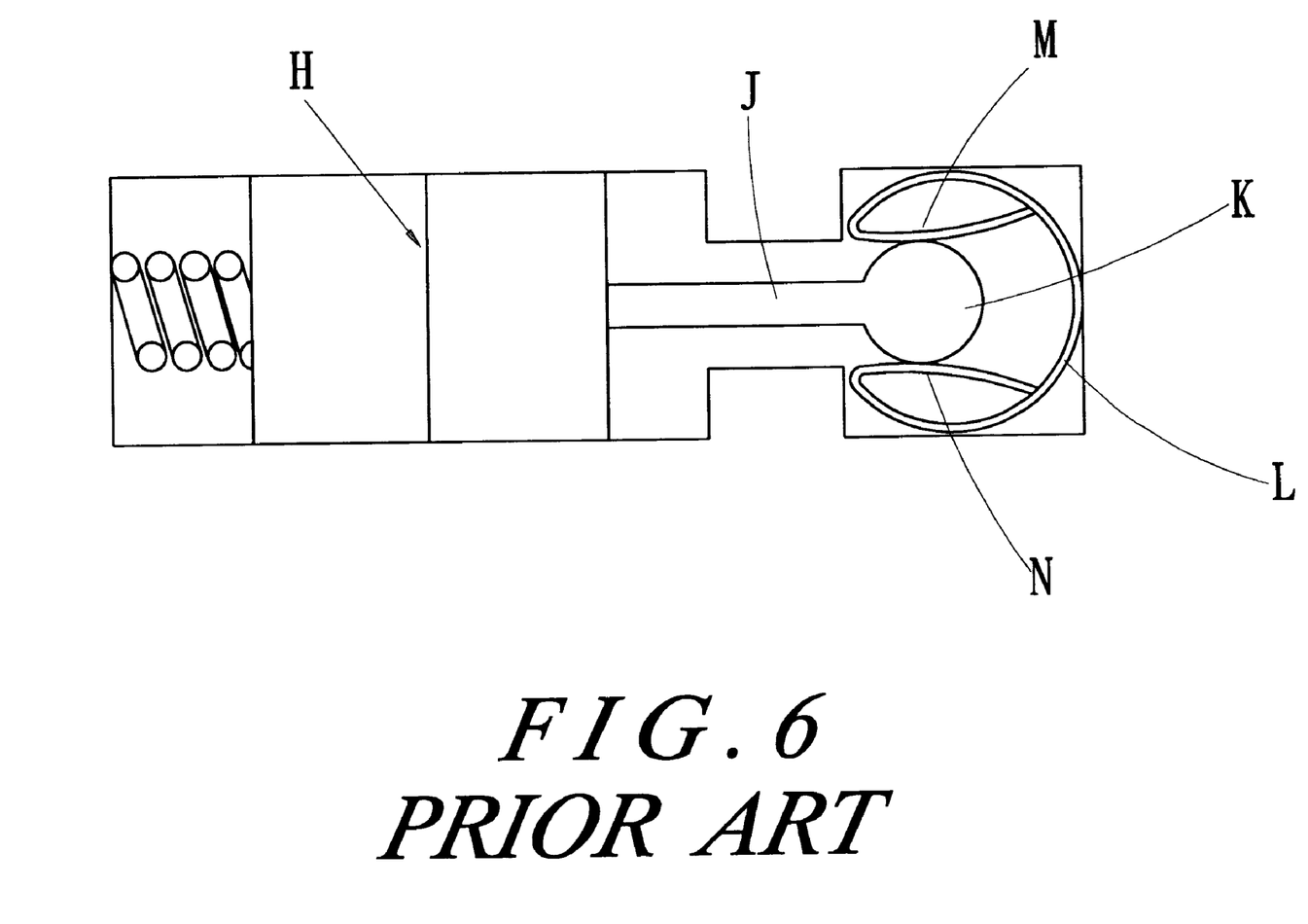
FIG. 6 is a schematic view showing operation of the structure of FIG. 4.
Figure 7:
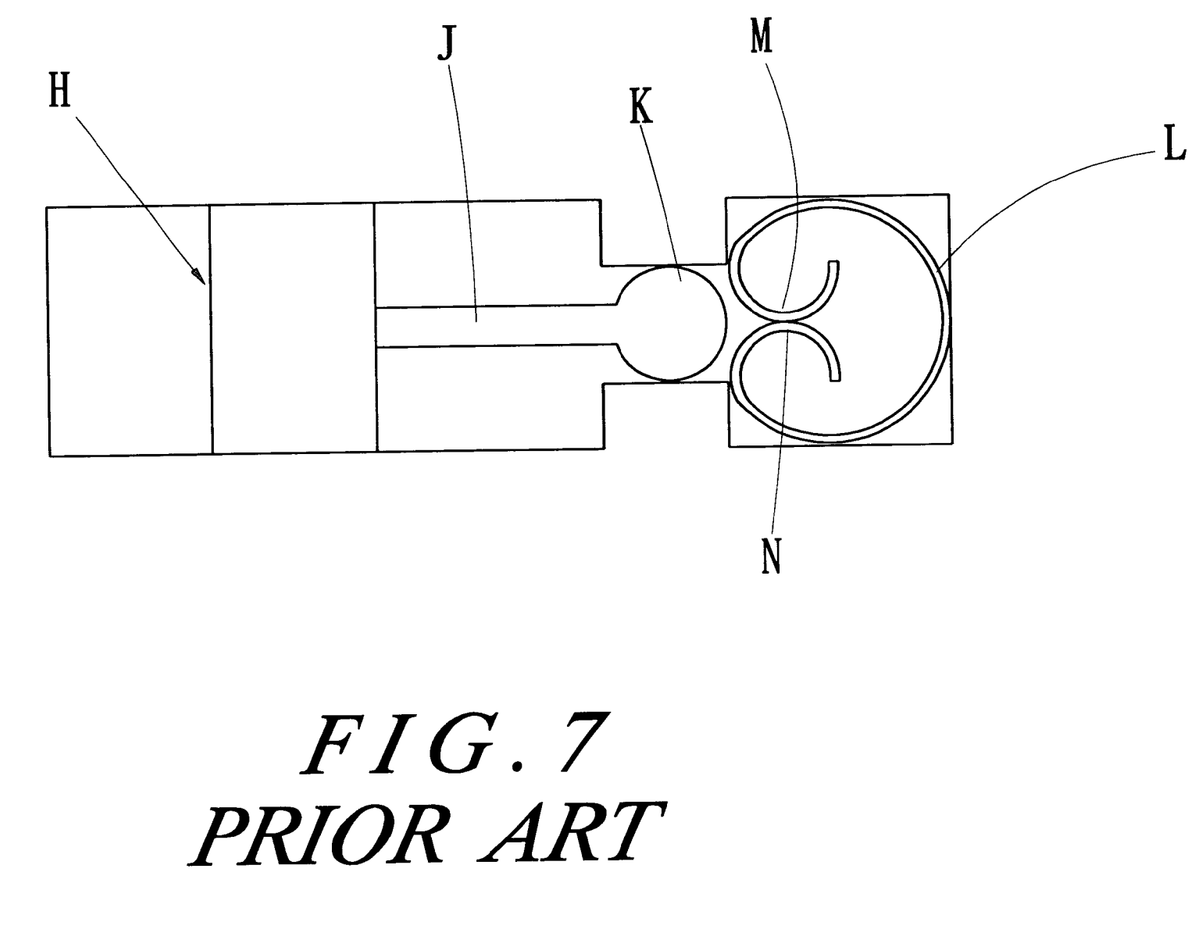
FIG. 7 is another schematic view showing operation of the structure of FIG. 4.

Before an inserting and extracting member 20 is inserted into the insertion seat 10, the round block "K" and the link "J" are locked by clamping of contacting sections 'M', "N" of an elastic sheet "L", when the inserting and extracting member 20 is inserted into a channel 11 to abut against and push inwardly the slide block "H", the round block "K" on the end of the link "J" is moved inwardly (as shown in FIG. 6) to push away the contacting sections 'M', "N" of an elastic sheet "L". And when the inserting and extracting member 20 is pushed in position, the round block "K" on the end of the link "J" is released from clamping of the elastic sheet "L", so that the contacting sections 'M', "N" collide with each other (as shown in FIG. 7) to make a sound indicating that the inserting and extracting member 20 is inserted in position.

The card positioning structure surely can generate a sound when the inserting and extracting member 20 is positioned, however, the sound of collision by the contacting sections 'M', "N" of the elastic sheet "L" is smaller, the effect of indicating by the sound is not ideal; and by repeated entering and drawing out of the round block "K", the elastic sheet "L" is extremely subjected to elastic fatigue and losing its elasticity.

In summarizing the above defects of conventional card positioning structures, the inventor of the present invention developed a sounding-positioning device for a card puller after continuous studying and improvement successfully to get rid of the aforesaid defects of the conventional card positioning structures.

In particular, the positioning-sounding device for a card puller of the present invention mainly is mounted in a slide groove of an insertion seat; the sounding device is comprised of a slide block and an elastic element. The slide block and the elastic element can slide in the slide groove of the insertion seat, thereby, when an inserting and extracting member is inserted into the channel of the insertion seat, it pushes the slide block for moving, so that the elastic element thereunder is compressed; when the inserting and extracting member is inserted in position, the slide block is exactly abutted against and is released from the inserting and extracting member and is elastically restored to its original position by the elastic element.

SUMMARY OF THE INVENTION

The main object of the present invention is to provide a function to make a user be certain that an inserting and extracting member is surely inserted in position by a knocking sound when a slide block collide the inner wall of a slide groove by restoring of the slide block to its original position by the elastic restoring of an elastic element.

The secondary object of the present invention is to make wide using of a sounding device, which is capable of making sound when the inserting and extracting member is inserted in position, on the inserting and connecting structures of card puller devices for various IC cards and memory cards (such as smart cards, MS cards, SD cards, CF cards, Pcmcia cards, SMC cards and MMC cards etc.). Thereby, by indicating being in position with the sound during insertion of the inserting and extracting member, inserting of the inserting and extracting member can be surer.

The present invention will be apparent in its structure, assembling as well as its way of use after reading the detailed description of the preferred embodiment thereof in reference to the accompanying drawings.

DETAILED DESCRIPTION OF THE PREFERRED EMBODIMENT

Figure 8:
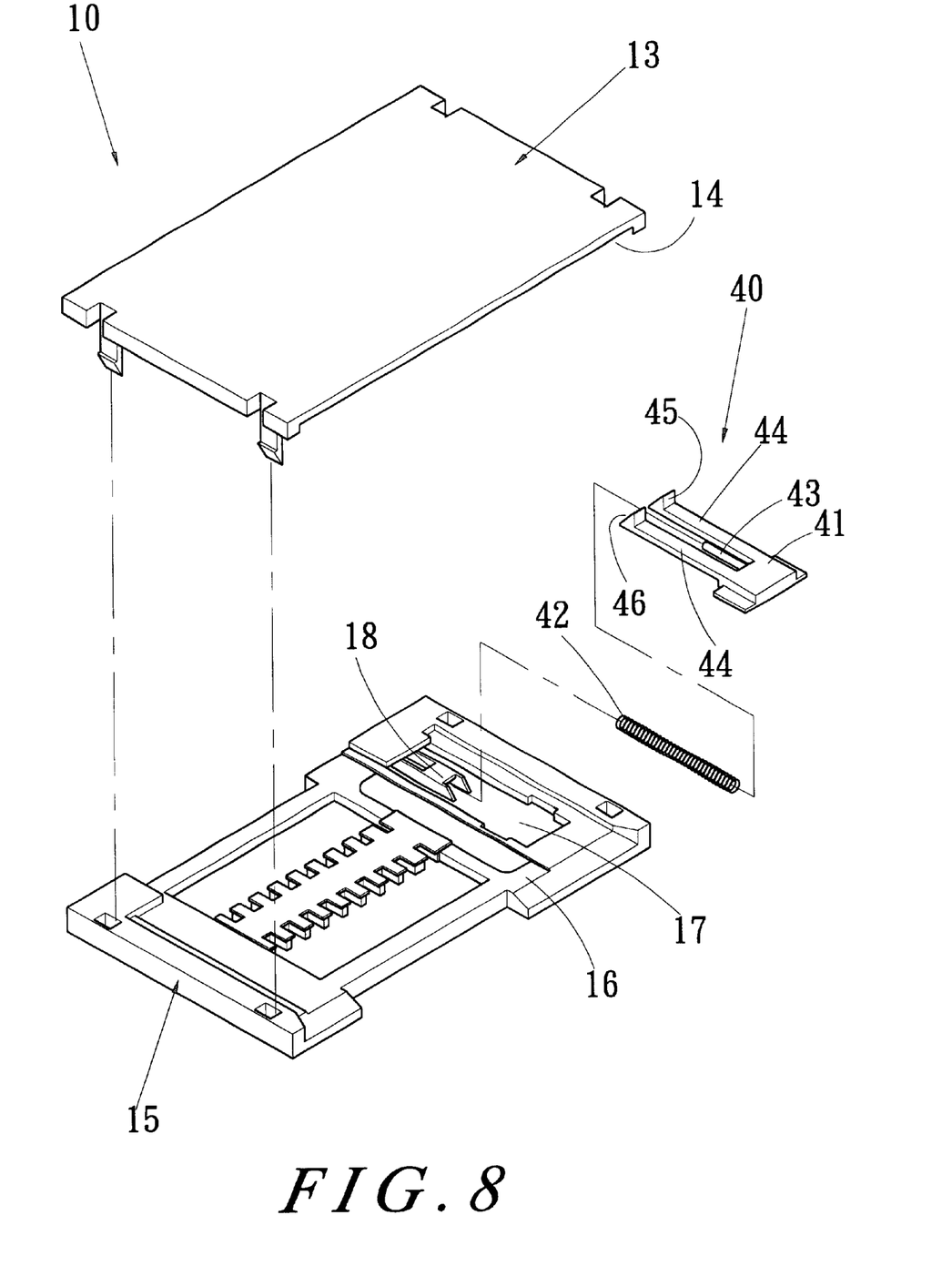
FIG. 8 is an analytic perspective view of the first embodiment of the present invention.
Figure 9:
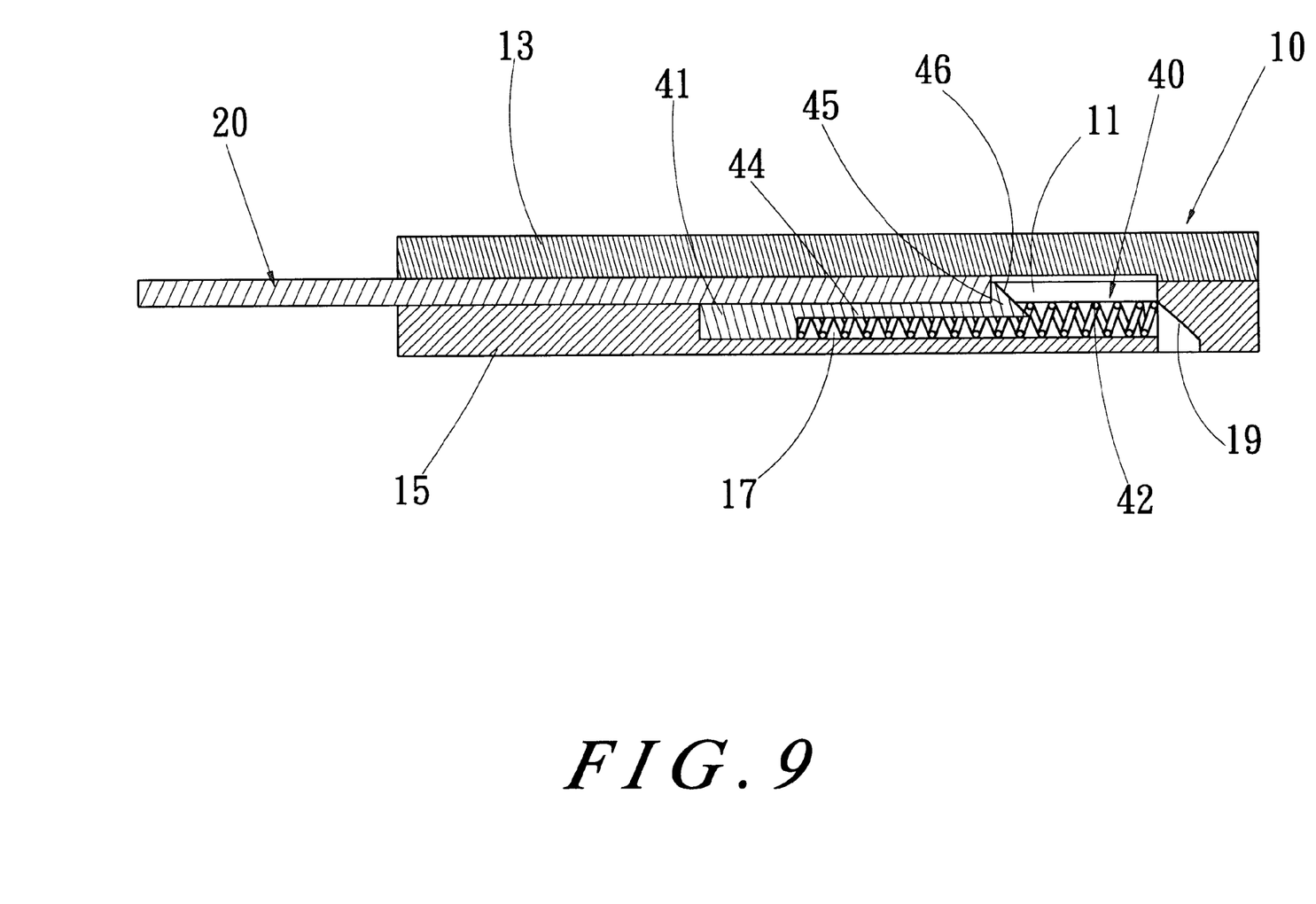
FIG. 9 is a sectional view showing the structure of FIG. 8.

Referring to FIGS. 8 and 9, they express the situations of the positioning-sounding device for a card puller of the present invention used in an inserting and connecting device for IC cards:

A sounding device 40 for the card puller is mounted in an insertion seat 10, wherein:

The insertion seat 10 is comprised of an upper lid 13 and a lower seat 15. The upper lid 13 is provided on the bottom thereof with an upper channel 14, while the lower seat 15 is provided at the corresponding area thereon to that of the upper channel 14 with a lower channel 16. When the lower seat 15 is combined with the upper lid 13, the upper and the lower channels 14, 16 form a channel 11 for insertion of an inserting and extracting member 20. And more, the lower channel 16 is provided thereon with a slide groove 17 which has a hollow position-limiting seat 18 therein, and is provided on the rear end thereof with an inclined guide wall 19.

The sounding device 40 is mounted in the slide groove 17 and is provided with a slide block 41 and an elastic element 42; the sounding device 40 is embedded in the slide groove 17, one end of the elastic element 42 is extended into the position limiting seat 18 in the slide groove 17 to be limited by the position limiting seat 18 from deviation, the other end of the elastic element 42 is slipped over a position limiting stem 43 of the slide block 41, the rear end of the slide block 41 is provided with two extending arms 44 of which the ends are raised to form two stop edges 45, the stop edges 45 form on the rear end thereof two down tilting surfaces 46.

Figure 10:
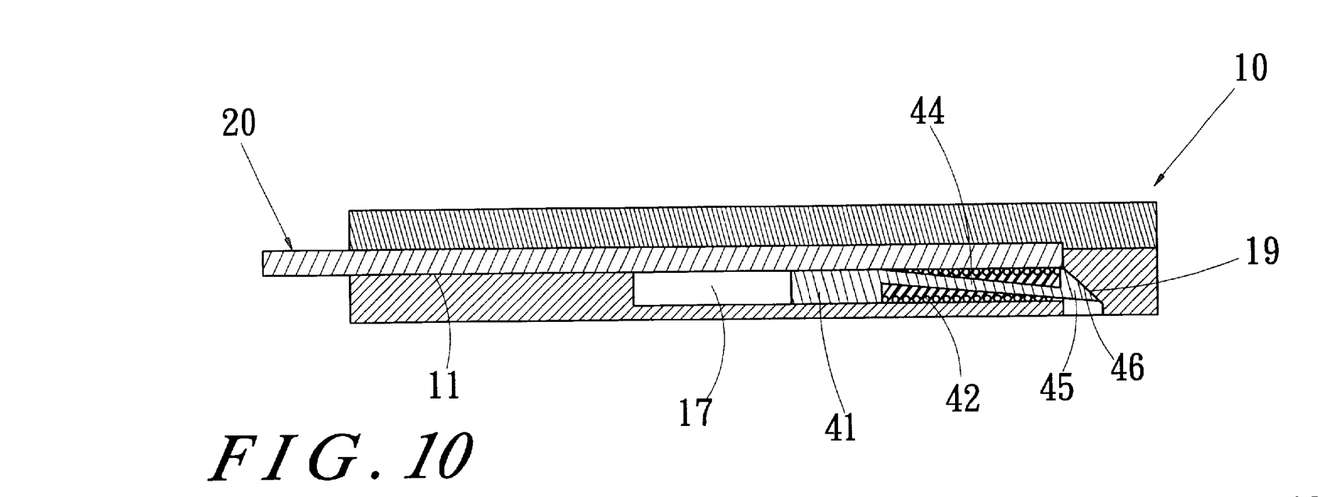
FIG. 10 is a schematic view showing operation of the structure of FIG. 8.
Figure 11:
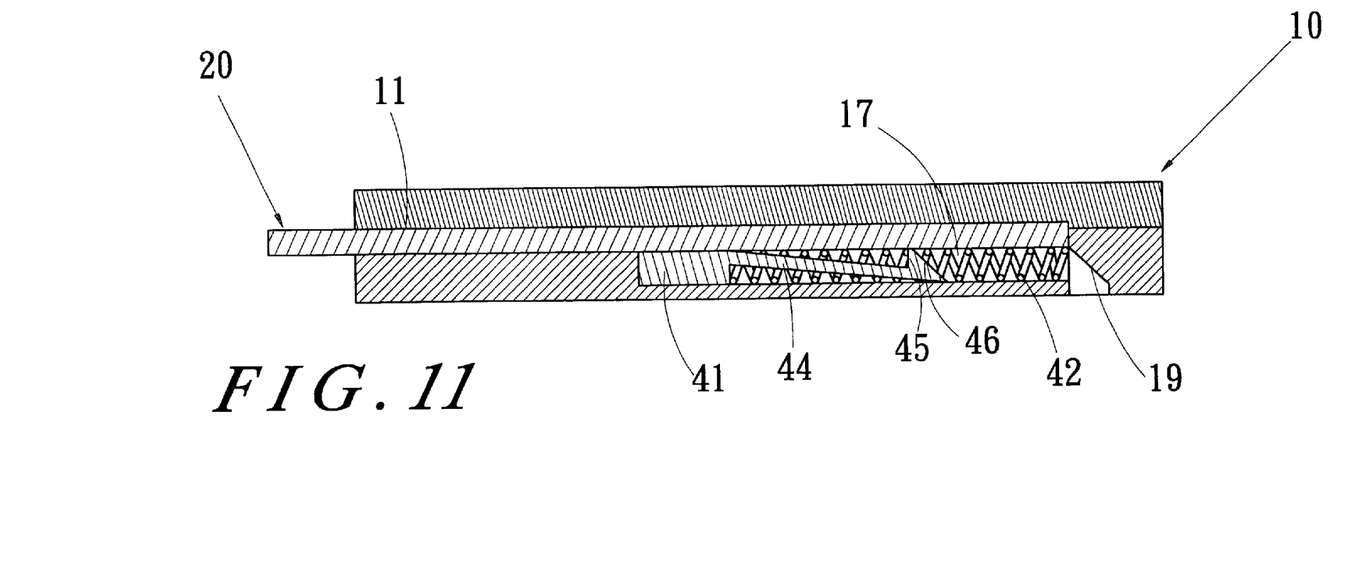
FIG. 11 is another schematic view showing operation of the structure of FIG. 8.

Referring simultaneously to FIGS. 10 and 11, with the above stated positioning-sounding device for a card puller, when the inserting and extracting member 20 is inserted into the channel 11 of the insertion seat 10, its inserting end is abutted against the two stop edges 45 of the slide block 41; when the inserting and extracting member 20 is moved inwardly of the channel 11, it synchronically drives the slide block 41 inwardly (as shown in FIG. 10) to compress the elastic element 42.

When the inserting and extracting member 20 moves the slide block 41 to the inclined guide wall 19 on the rear end of the channel 11, the down tilting surfaces 46 on the rear end of the slide block 41 are restrained by the inclined guide wall 19 and slide down, at this time, the two extending arms 44 down tilt along with them.

By the reason that when the two extending arms 44 tilt down, the two stop edges 45 of the slide block 41 will gradually be released from the inserting end of the inserting and extracting member 20; hence when they are completely released, the slide block 41 will be elastically restored to its original position by the elastic element 42; during such restoring, the front side of the slide block 41 will make surface collision with the inner wall of the slide groove 17 (as shown in FIG. 11), so that the sound made can be an indicating sound telling that the inserting and extracting member 20 has been inserted in position. And more, when the inserting and extracting member 20 is retracted from the channel 11, the two extending arms 44 on the rear end of the slide block 41 will restore their upper positions, so that when the inserting and extracting member 20 is inserted again, a sound of collision can be generated again in sliding.

Figure 12:
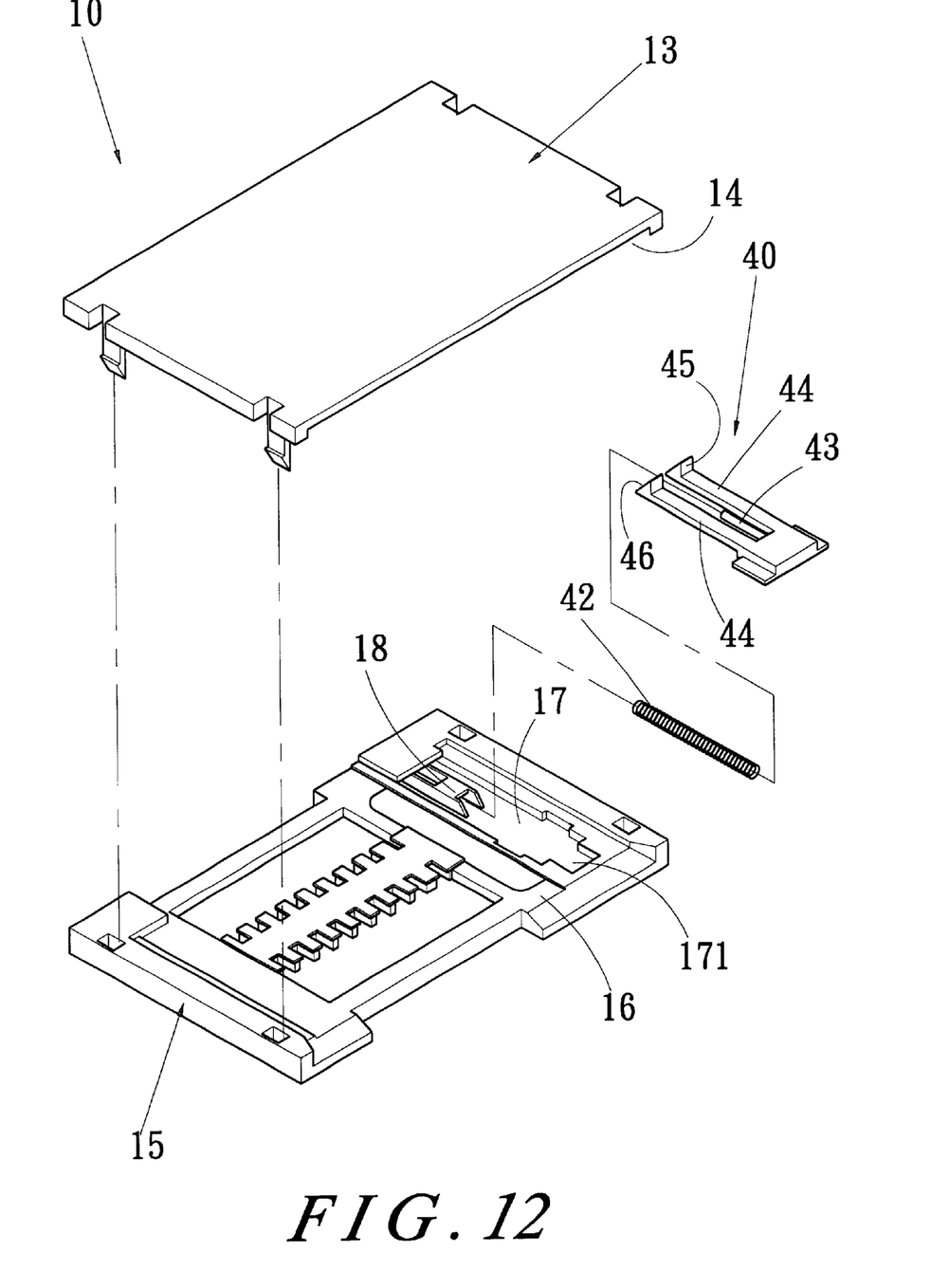
FIG. 12 is an analytic perspective view of the second embodiment of the present invention.
Figure 13:
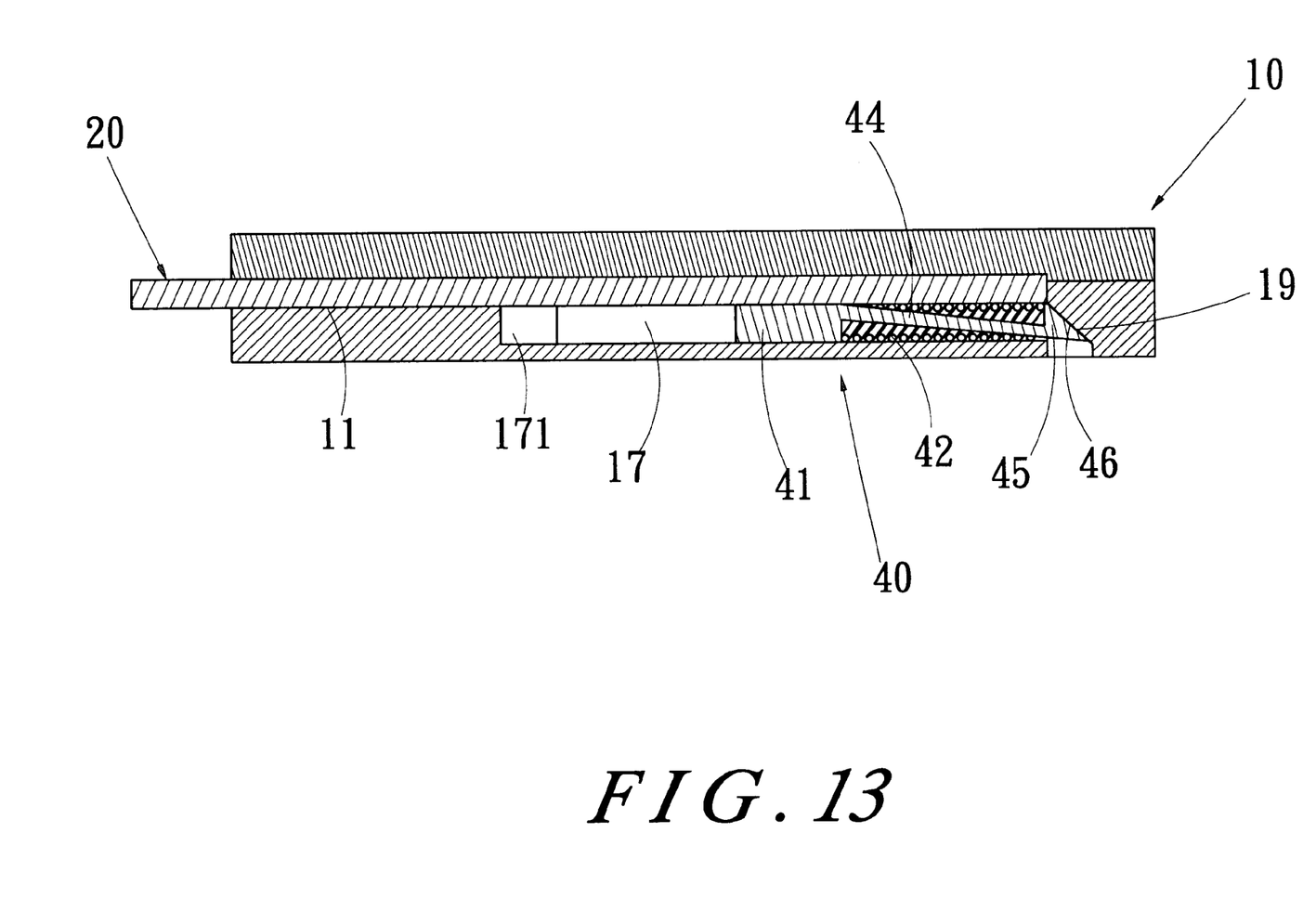
FIG. 13 is a sectional view showing the structure of FIG. 12.

Referring to FIGS. 12 and 13 depicting a resonance groove 171 is added on the inner wall of the slide groove 17 when in practicing the positioning-sounding device for the card puller; thereby, when the slide block 41 knocks the inner wall of the slide groove 17 in back moving, the sound generated by knocking is vibrated in the space of the resonance groove 171 to make a larger sound.

Figure 14:
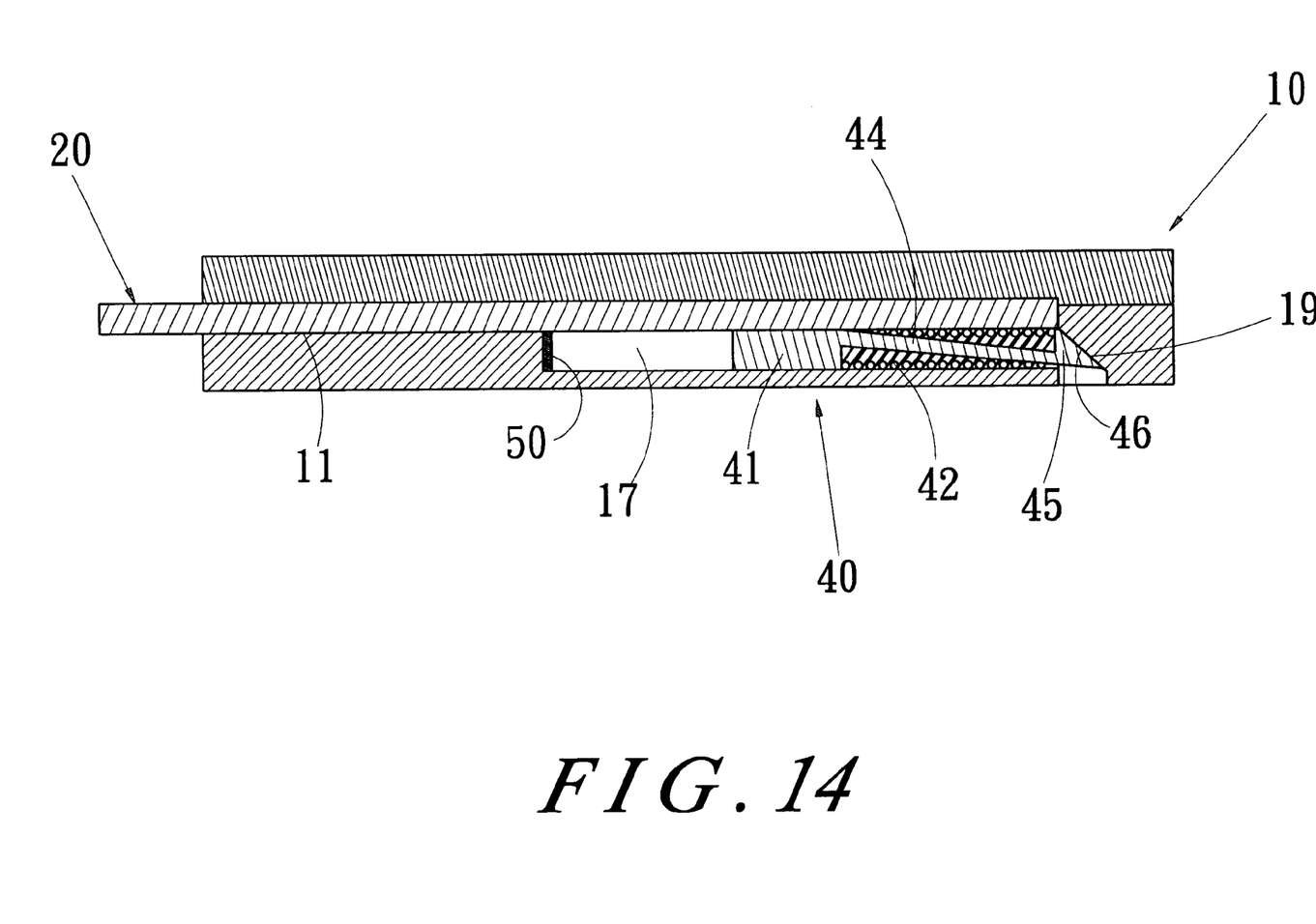
FIG. 14 is a sectional view showing the structure of the third embodiment of the present invention.

Referring to FIG. 14, when in practicing of the positioning-sounding device for a card puller, a metallic knocking piece 50 is fixedly provided on the inner wall of the slide groove 17 or on the front side of the slide block 41

Figure 15:
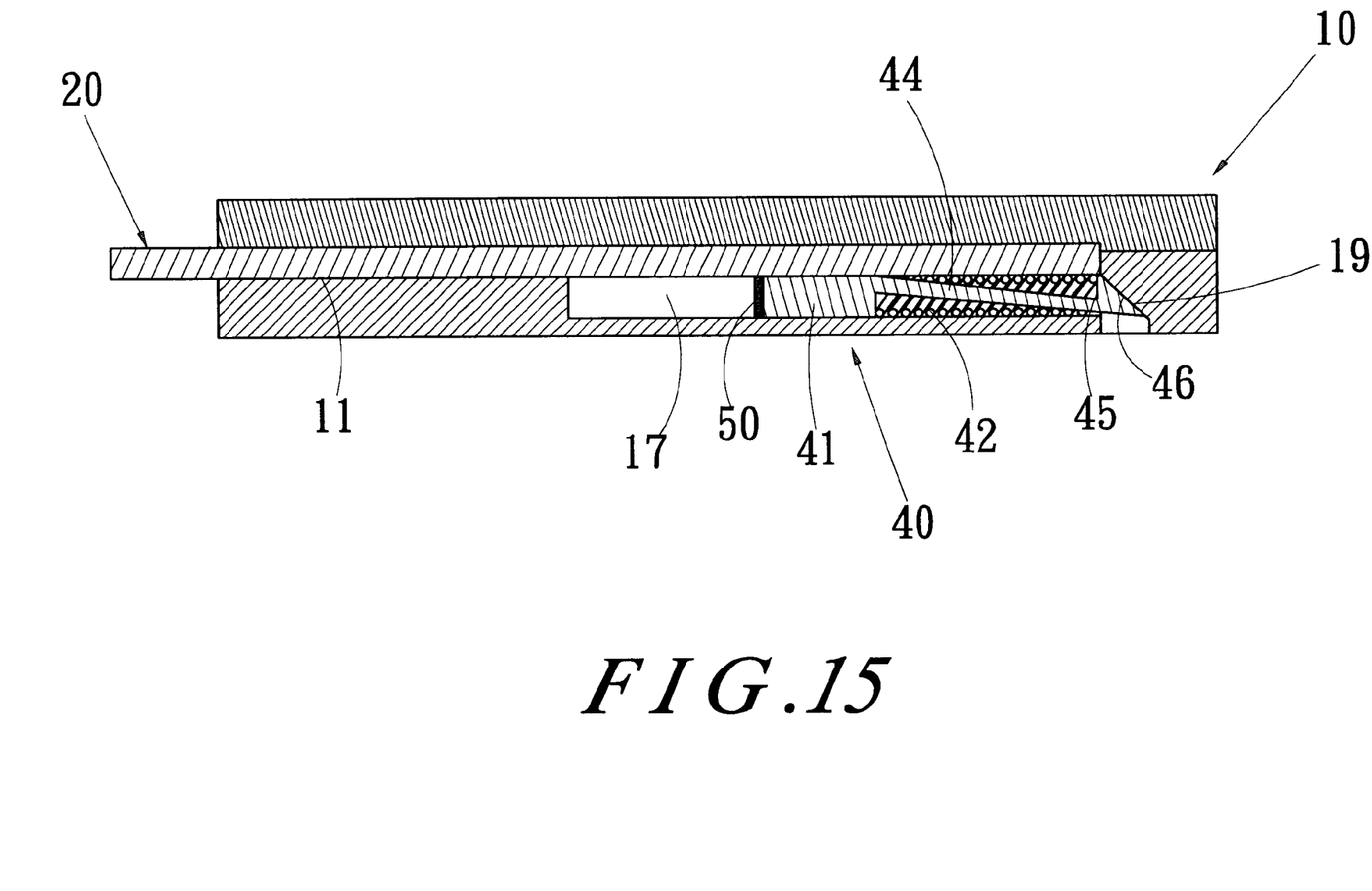
FIG. 15 is a sectional view showing the structure of the fourth embodiment of the present invention.
Figure 16:
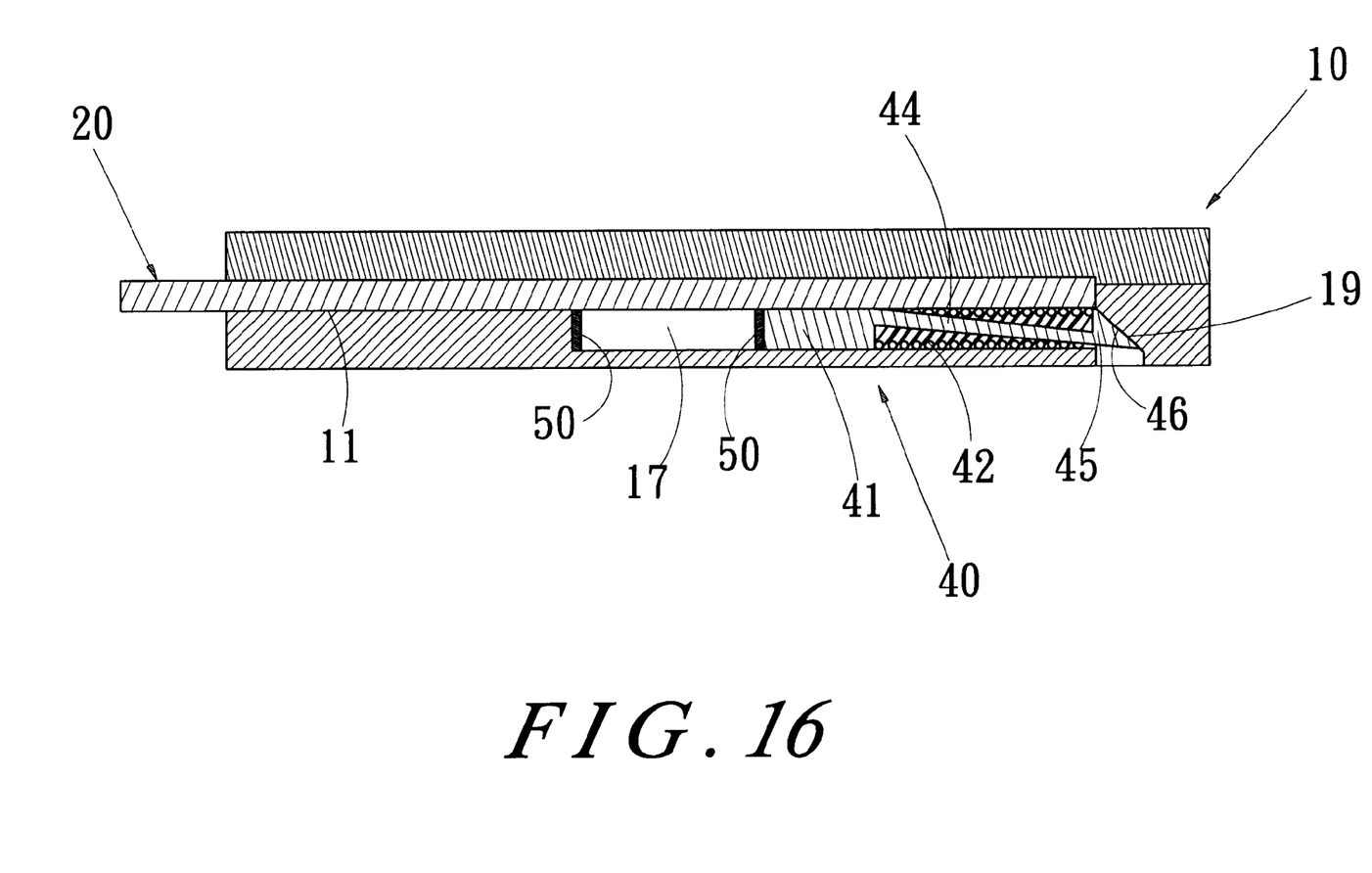
FIG. 16 is a sectional view showing the structure of the fifth embodiment of the present invention.

(as shown in FIG. 15). Thereby, when the slide block 41 knocks the metallic knocking piece 50, a larger knocking sound is generated. Certainly, two metallic knocking pieces 50 can also be provided simultaneously on the inner wall of the slide groove 17 and the front side of the slide block 41 (as shown in FIG. 16), so that by mutual collision of the two knocking pieces 50, the slide block 41 can generate a larger sound when in back moving.

In conclusion, the positioning-sounding device for a card puller of the present invention not only can make the sounding device 40 generate a knocking sound when the inserting and extracting member 20 is inserted into the insertion seat 10 indicating that the inserting and extracting member 20 is inserted in position to eliminate the defects of being subjected to uncertain insertion, inferior connecting and errors in reading etc., but also render the sounding device 40 widely suitable for various IC cards and memory cards (such as smart cards, compact flash cards, secure digital cards, memory stick cards, smart media cards, multi media cards, Pcmcia cards etc.) and any device requiring extended usage by the mode of inserting and extracting.

Having thus described the technical structure of my invention with practicability and having high industrial value, therefore, what I claim as new and desire to be secured by Letters Patent of the United States are:

1. A positioning-sounding device for a card puller, wherein a sounding device is mounted in an insertion seat to generate a sound when an inserting and extracting member is inserted in position; said insertion seat has a channel for insertion of said inserting and extracting member and has a slide groove for mounting said sounding device therein; said sounding device is provided with a slide block and an elastic element, when said inserting and extracting member is inserted, its inserting end is abutted against said slide block to drive it inwardly to compress said elastic element; when said inserting and extracting member is inserted in position, said slide block is abutted against and is released from said inserting and extracting member and is elastically moved by said elastic element to collide with the inner wall of said slide groove indicating that said inserting and extracting member is surely inserted in position.

2. A positioning-sounding device for a card puller comprising:

an insertion seat having an upper lid and a lower seat, said upper lid and said lower seat form a channel therebetween for insertion of an inserting and extracting member, and are provided with a slide groove which is provided on the rear end thereof with an inclined guide wall, a sounding device mounted in said slide groove and being comprised of a slide block and an elastic element, one end of said elastic element is fixed behind said slide groove, while the other end thereof is fixed on said slide block, said slide block is provided on the rear end thereof with two extending arms;

with said sounding device, when said inserting and extracting member is moved inwardly of said channel, it synchronically drives said slide block inwardly to compress said elastic element; and when said inserting and extracting member is inserted in position, said slide block displaces by guiding of said inclined guide wall and is elastically restored to its original position by said elastic element to knock the inner wall of said slide groove to generate a sound indicating that said inserting and extracting member is surely inserted in position.

3. A positioning-sounding device for a card puller as claimed in claim 2, wherein, a hollow position-limiting seat is provided in front of said inclined guide wall on the rear end of said slide groove; the ends of said extending arms on the rear end of said slide block are provided with a plurality of stop edges to stop an inserting end of said inserting and extracting member, said stop edges form on the rear end thereof a plurality of tilting surfaces for easier guiding along said inclined guide wall.

4. A positioning-sounding device for a card puller as claimed in claim 2, wherein, a resonance groove is added on said inner wall of said slide groove in said lower seat, thereby, said sound generated when said slide block knocks said inner wall of said slide groove is vibrated in the space of said resonance groove to make a larger sound.

5. A positioning-sounding device for a card puller as claimed in claim 2, wherein, a metallic knocking piece is fixedly provided on said inner wall of said slide groove of said lower seat or on the front side of said slide block, thereby, when said slide block knocks said metallic knocking piece, a larger knocking sound is generated.

6. A positioning-sounding device for a card puller as claimed in claim 2, wherein, two metallic knocking pieces are provided respectively on said inner wall of said slide groove and the front side of said slide block, so that by mutual collision of said two knocking pieces of said slide block and said inner wall of said slide groove, a larger sound is generated.

* * * * *